United States Patent [19]
Carilli

[11] Patent Number: 5,269,590
[45] Date of Patent: Dec. 14, 1993

[54] MULTI-LAYER HIGH IMPACT SEATING

[76] Inventor: Brian D. Carilli, 2150 Columbia, Palo Alto, Calif. 94306

[21] Appl. No.: 984,089

[22] Filed: Nov. 30, 1992

Related U.S. Application Data

[63] Continuation-in-part of Ser. No. 840,592, Feb. 19, 1992, abandoned, which is a continuation of Ser. No. 673,242, Mar. 19, 1991, abandoned, which is a continuation of Ser. No. 525,920, May 21, 1990, abandoned.

[51] Int. Cl.$^5$ ................................. A47C 7/20
[52] U.S. Cl. .................... 297/452.55; 297/DIG. 1; 297/216.1
[58] Field of Search ............... 297/DIG. 1, 452, 216; 5/464, 480

[56] References Cited

U.S. PATENT DOCUMENTS

| | | | |
|---|---|---|---|
| Re. 32,734 | 8/1988 | McLeod | 5/464 |
| 2,543,218 | 2/1951 | Young et al. | 5/480 X |
| 3,248,738 | 5/1966 | Morgan | 297/452 X |
| 3,534,417 | 10/1970 | Boyles | 5/464 |
| 3,833,259 | 9/1974 | Pershing | 297/452 |

*Primary Examiner*—Kenneth J. Dorner
*Assistant Examiner*—Milton Nelson, Jr.
*Attorney, Agent, or Firm*—Julian Caplan

[57] ABSTRACT

A seat cushion system that reduces the vertical impact to the seat occupant within the space and cost constraints of existing seat support structures. In one embodiment, the seat cushion employs a series of layers of varying density and lateral displacement foams with a rigid or semi-rigid material within the cushion. Each layer of foam can change in both density and lateral displacement depending on the volumetric space available. Another embodiment demonstrates how only two layers of differing densities and lateral displacement can greatly reduce the impact force from vertical thrust.

8 Claims, 2 Drawing Sheets

MULTI-LAYER HIGH IMPACT SEATING

CROSS REFERENCE TO RELATED APPLICATIONS

This application is a continuation-in-part of co-pending application Ser. No. 07/840,592, filed Feb. 19, 1992, now abandoned, which was a continuation of application Ser. No. 07/673,242, filed Mar. 19, 1991, now abandoned, which was a continuation of application Ser. No. 07/525,920, filed May 21, 1990, now abandoned.

BACKGROUND OF THE INVENTION

1. Field of the Invention

The present invention relates generally to high impact seating, specifically, seating that is associated with a moving device, i.e. boat, tractor, etc. and the ability to reduce impact on the human body, within the space and cost constraints of existing seat configurations.

2. Description of Prior Art

The shape and size of the human frame present a sizable challenge when trying to fit this into a uniform product. Much of the existing seating is no more than a cushion constructed of a single piece of medium density foam rubber with an internal lateral displacement of 20 to 30. More elaborate seats have added mechanical equipment to enhance the impact reduction attributes. Most of these remove the impact by use of devices such as oil or air filled type shock absorbers. The mechanical devices accomplish this by a series of hinges and levers attached to the shock absorber mounted under the cushion area of the seat. This allows the impact of the vertical thrust to be transferred to the occupant over a longer period of time, thus reducing the force. The shock absorber also takes the bounce out of the recoil when returning to the original position. This point is critical; not only is it necessary to extend the duration of the impact but also the return from the impact as to not eject the occupant from his seat.

A short-coming of the current available high impact seating is that the mechanical devices require substantial space under the cushion area of the seat.

Another short-coming of the prior art is that the mechanical devices require maintenance.

Another short-coming is that the mounting of these devices is not adaptable for tractors, cars, trucks and boats, and that these devices are too large and heavy for aircraft.

A final short-coming of the prior art is the high cost associated with both purchase and installation.

OBJECTS

Accordingly, several objects of my invention are reduction of force transmitted to the human structure, volumetric space reduction, weight and cost. When a human being is sitting in a moving device such as a boat, plane, tractor, car, etc., there are a variety of forces at work. The primary purpose of this invention is to greatly reduce the force from vertical impact or thrust. Vertical impact is oriented to the human structure whereas the force from centrifugal energy within a moving device (i.e. aircraft, boat, car, etc.) can be horizontal to a gravitational point of reference but still transmit energy through the longitudinal direction of the occupant. This impact causes the greatest injury and/or discomfort, due to the structure of the human body, primarily between the head and the pelvic area, there is a great deal of lateral flexibility. It can not however, be compressed, due to the spinal structure which is nothing more than a stacking of relatively non-compressible bones and cartilage. The organs in the lower abdominal area are also susceptible to damage or injury as a result of sudden and repetitive impact(s). To remove the impact from a vertical motion one must deal with this energy as a function of time. Force equals mass of the human times the acceleration of the vertical lift (F=MA) and acceleration is equal to velocity or speed over time (A=V/T). Thus if the time is extended the acceleration is decreased and finally the force is reduced. (F=M(V/T))

By the use of several densities of foam rubber materials in a precise manner a cushion can be constructed that will take both the shape of the human structure as well as reduce the force due to sudden vertical impact. In the preferred embodiment, this is accomplished by starting with a low density foam in the range of 1.05 to 1.08 with an internal lateral displacement of 18 to 24 that forms to the immediate surface area of the human structure, primarily the buttocks. This is then laminated to a higher density foam in the 1.25 range with an internal lateral displacement of 30 to 36, that spreads the force laterally as well as vertically, taking full advantage of the internal lateral displacement. Further lamination to even higher density and internal lateral displacement might be necessary in some extreme conditions. These two or more layers of foam may be attached by an adhesive through manufacturing or individually to a semi-rigid piece of material i.e. ply wood or sheet plastic, aluminum, metal which is of substantially uniform rigidity throughout. This semi-rigid material will be then placed atop an adhesive to a section of foam of uniform density, the preferred embodiment of which will be of medium density with an internal lateral displacement of 30 to 36. The thickness of each of these layers is contingent upon the total volumetric area available and the average anticipated vertical thrust. Depending on the situation and application, a minimum arrangement would be the use of a medium density to high density foam with an internal lateral displacement of 30 to 40 at a depth of only 2 inches placed atop a low density foam with an internal lateral displacement of 18 to 24 of similar depth with an optional ¼ inch piece of semi-rigid material separating the two foam rubber pieces. This would be enough to reduce a force by 50% or greater. In this last case of minimum foam area, the internal lateral displacement properties of the foam can by itself disperse the vertical thrust by allowing the higher density foam or semi-rigid foam to transmit its energy to the lesser density foam directly. Accordingly, manufacturing techniques are such that foam rubber could be made so that both the density and internal lateral displacement could be varied within a homogeneous sheet with a straight line progression of softening or hardening through the piece of material. All of these cushions must be placed atop a structure that would support the cushion and occupant. This structure could be flat, curved, rigid or semi-flexible or any combination thereof. These seat structures are commercially available and the adaptability of this invention is straightforward and cost effective.

SUMMARY OF THE INVENTION

Accordingly, it is an objective of this invention to provide a high and low impact seating through the lamination of multi-layers of foam product with differing densities and internal lateral displacements with an optional rigid or semi-rigid product to greatly reduce the pressure and stress on the human body.

It is another objective of the invention to provide high and low impact seating with the ability to be adapted to all existing physical constraints.

It is another objective of the invention to provide high and low impact seating with little or no cost increase.

It is another objective of the invention to provide high and low impact seating without adding significant weight or size.

The attainment of these and related objects may be achieved through the use of the novel multi-layer foam impact seating herein disclosed.

Further objects and advantages of my invention will become apparent from consideration of the drawings and ensuring description thereof.

BRIEF DESCRIPTION OF THE DRAWINGS

The accompanying drawings, which are incorporated in and form a part of this specification, illustrate embodiments of the invention and, together with the description, serve to explain the principles of the invention.

Additional objects and features of the invention will be more readily apparent from the following detailed description and appended claims when taken in conjunction with the drawings, in which:

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
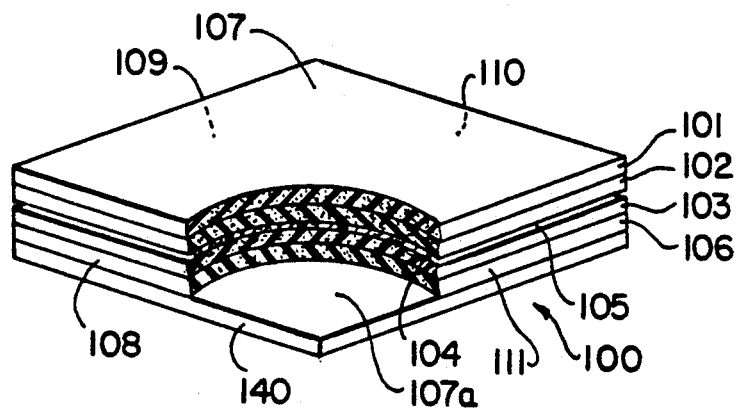
FIG. 1 is a perspective with partial sectional view of the preferred embodiment of a multi-layer high impact seat.
Figure 2:
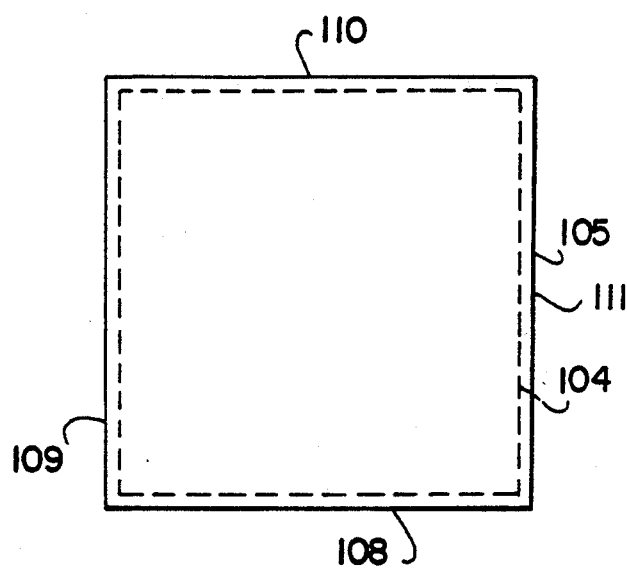
FIG. 2 is a plan view of the first preferred embodiment of a multi-layer high impact seat.
Figure 3:
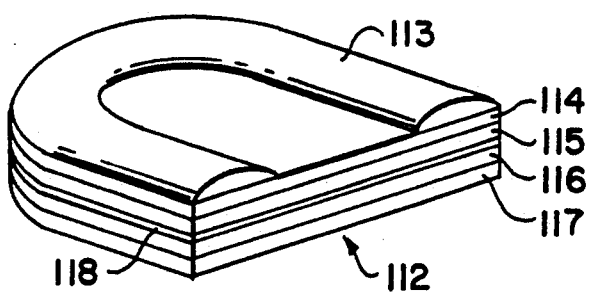
FIG. 3 is a perspective view of a second embodiment of a multi-layer high impact seat in accordance with the present invention.
Figure 4:
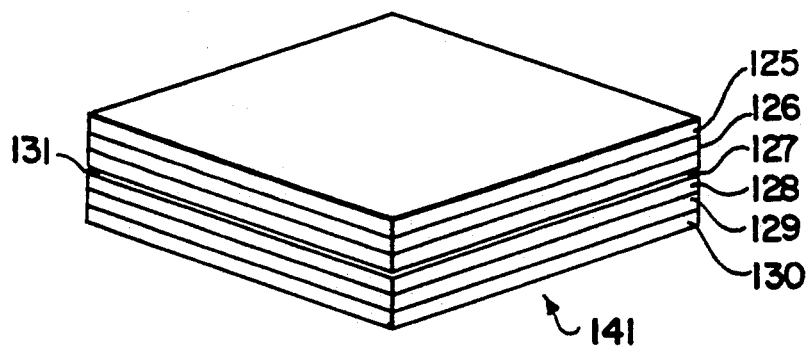
FIG. 4 is a perspective view of a third embodiment of a multi-layer high impact seat in accordance with the present invention.

Several preferred embodiments of the invention are present. FIGS. 1 and 2 relate to the first embodiment in which a piece of multi-layer foam is shown. FIG. 3 is the second embodiment in which the form of the seat has been included. FIG. 4 depicts a third embodiment which is similar to the first embodiment, except showing how more layers of foam might be arranged.

Referring to FIG. 1, there is shown a piece of multi-layer high impact seat 100 having faces 108, 109, 110 and 111 and top 107 and bottom 107a. The seat 100 in this first preferred embodiment is comprised of layers 101, 102, 103 and 106 of differing densities and internal lateral displacements of foam rubber material. Layered within the layers 102 and 103 is a piece of rigid or semi-rigid material 104. Layer 104 is of substantially uniform rigidity throughout. This rigid material is reduced in width and length but is generally the same size as the foam material so as to provide comfort to the occupant of the seat by means of an over lapping piece of foam rubber 105. The dimensions of one implementation of one seat 100 are 2 ft.×2 ft.×4⅜ in. The dimensions of layers 102, 103, 105 and 106 are 2 ft.×2 ft.×4 in. The dimension of the rigid material is 1 ft. 11¼ in.×1 ft. 11¾ in.×⅜ in. The dimension of the set back 105 is ⅜ in. The set back 105 in the first embodiment would be an integral part of layer 102 and 106. The sides of the first embodiment 108, 109, 110 and 111, are equal in dimension measuring 4⅜ in.×2 ft. The density of layer 101 would be in the range of 1.05 to 1.08 with an internal lateral displacement of 18 to 24. The density of layer 102 and 103 would be in the range of 1.25 with an internal lateral displacement of 30 to 36. It would be allowable to construct these layers of differing densities and internal lateral displacement of either open or closed cell foam rubber, depending on the application. Close cell foam rubber would render the seat cushion as a flotation device which would be an advantage in a marine or exterior application. Other material with similar properties to foam rubber would also be quite suitable for this type of seating. The preferred embodiment is shown placed atop a flat structure 140 which supports the invention.

Member 104 spreads force applied to the top layers over generally the entire horizontal area of the lower cushion, which absorbs such forces by lateral displacement of materials in the lower cushion.

Referring to FIG. 2, there is shown a plan view of a seat 100. The dimension of this plan view of the first embodiment are 2 ft.×2 ft. with the rigid material set back with a dimension of 1 ft. 11¼ in.×1 ft. 11¼ in.

Referring to FIG. 3, there is shown a perspective view of a second embodiment showing possible contours 113 in the portion of the seat 112 which would be placed against the occupant. The construction of this seat would be in the same fashion as the first embodiment with the exception of the higher density of the contour. Layers 114, 115, 116, 117 and 118 would be the same density and lateral displacement as layers 101, 102, 103, 106, and 104 in FIG. 1 in the first embodiment.

Referring to FIG. 4, there is shown another perspective of additional layers of foam with still greater diversity in the density and internal lateral displacement. These layers 126, 127, 128, and 129 are dimensionally and functionally the same as 101, 102, 103 and 106 but the additional layers 125 and 130 are dimensionally the same but have lower density and lateral displacements. The example is to show that the comfort of the seat 141 is not limited to the four layer preferred embodiment but can be tailored to an individual's needs and space requirements.

Figure 5:
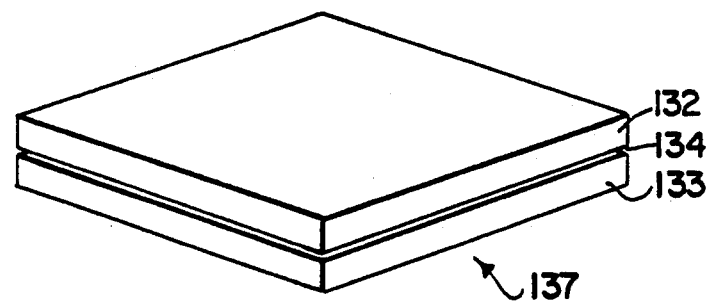
FIG. 5 is a perspective view of a fourth embodiment of a multi-layer high impact seat in accordance with the present invention.

Referring to FIG. 5, there is shown a perspective view of a multi-layer foam product 137 manufactured with a varied density and internal lateral displacement within what appears to be a homogeneous material 132 or 133. With the manufacturing techniques available it is also possible to include the rigid material 134 within this seemingly homogeneous material. This approach would only be feasible for larger production runs.

Figure 6:
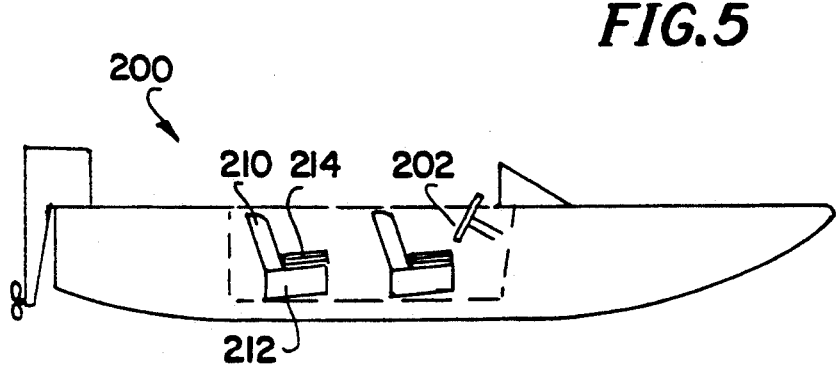
FIG. 6 schematically depicts seats in a moving vehicle in accordance with the present invention.

Referring to FIG. 6, there is shown a boat 200, with a passenger compartment 202 in which there is at least one passenger seat 210 made in accordance with the present invention.

The seat 210 includes a seat base 212 fastened to the boat, and a seat cushion 214 attached on top of the seat base 212. The seat cushion 212 includes multiple cushion layers, as described above. More generally, such seats can be used in any moving device or vehicle so as to reduce impacts on the person associated with vertical movements of the device.

Figure 7:
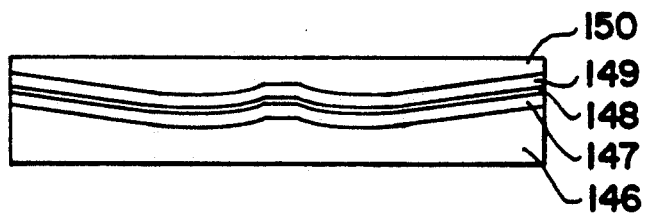
FIG. 7 is a vertical sectional view of a modification.

FIG. 7 shows a modification in which relatively rigid member 148 is preferably molded or pressed into a shape complementary to that of the buttocks of an average person likely to sit on the cushion. Any suitable material of relatively uniform rigidity, such as plastic or metal, may be used to construct members 148. Layers 146, 147, 149 and 150 may be materials similar to layers 106, 103, 102 and 101, respectively, of the modification of FIG. 1. It will be understood that the top and bottom of the cushion are planar and that the boundary surfaces of the layers are complementary to the shape of relatively rigid member 148.

As used in the accompanying claims, the words "vertical," "horizontal," "below," and "on top" are used in the sense of the orientation of FIG. 1 of the accompanying drawings.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A multi-layer seat which protects a person sitting on the seat in a moving device from impacts associated with vertical movements of the seat in the device, the seat comprising:
    a seat base coupled to said moving device;
    a first cushion;
    a second cushion which is located vertically below said first cushion and which is positioned on top of said seat base; and
    a relatively rigid member having substantially uniform rigidity which (A) substantially separates said first and second cushions, (B) transmits vertical thrust to said cushions, and (C) moves vertically as a whole as said second cushion compresses;
    said first cushion being formed of a foam rubber material which partially absorbs a first downward vertical force applied to said first cushion from above by internal lateral displacement and partially transmits downward a second vertical downward force to said relatively rigid member,
    said relatively rigid member transmitting a third vertically downward force from said first cushion to said second cushion,
    said second cushion being formed of a foam rubber material of substantially unitary density having an internal lateral displacement of between 18 and 36 characterized by the fact that said third vertically downward force applied to said second cushion by said relatively rigid member is absorbed by internal lateral displacement of said foam rubber material in said second cushion;
    the vertical thicknesses of said first and second cushions being substantially greater than the vertical thickness of said relatively rigid member;
    said relatively rigid member having transverse dimensions including length and width dimensions, said first and second cushions having substantially identical transverse dimensions, said relatively rigid member having at least one transverse dimension generally less than the corresponding transverse dimensions of said first and second cushions, said relatively rigid member having a first outer edge, said first and second cushions having at least one common second outer edge and at least one indentation between said one common second outer edge of said first and second cushions and the corresponding first outer edge of said relatively rigid member;
    said corresponding first outer edge of said relatively rigid member being indented relative to said common second outer edge.

2. A multi-layer seat which protects a person sitting on the seat in a moving device from impacts associated with vertical movements of the seat in the device, the seat comprising:
    a seat base coupled to said moving device;
    a first cushion;
    a second cushion which is located vertically below said first cushion and which is positioned on top of said seat base; and
    a relatively rigid member having substantially uniform rigidity which (A) substantially separates said first and second cushions, (B) transmits vertical thrust to said cushions, and (C) moves vertically as a whole as said second cushion compresses;
    wherein said relatively rigid member spreads forces applied to said first cushion over generally the entire horizontal area of said second cushion and said second cushion absorbs said forces by lateral displacement of materials in said second cushion;
    the vertical thicknesses of said first and second cushions being substantially greater than the vertical thickness of said relatively rigid member;
    said relatively rigid member having transverse dimensions including length and width dimensions, said first and second cushions having substantially identical transverse dimensions, said relatively rigid member having at least one transverse dimension generally less than the corresponding transverse dimensions of said first and second cushions, said relatively rigid member having a first outer edge, said first and second cushions having at least one common second outer edge and at least one indentation between said one common second outer edge of said first and second cushions and the corresponding first outer edge of said relatively rigid member;
    said corresponding first outer edge of said relatively rigid member being indented relative to said common second outer edge, which further comprises an overlapping piece of foam rubber covering said indentation.

3. A multi-layer seat which protects a person sitting on the seat in a moving device from impacts associated with vertical movements of the seat in the device, the seat comprising:
  a seat base coupled to said moving device;
  a first cushion;
  a second cushion which is located vertically below said first cushion and which is positioned on top of said seat base; and
  a relatively rigid member having substantially uniform rigidity which (A) substantially separates said first and second cushions, (B) transmits vertical thrust to said cushions, and (C) moves vertically as a whole as said second cushion compresses;
  wherein said relatively rigid member spreads forces applied to said first cushion over generally the entire horizontal area of said second cushion and said second cushion absorbs said forces by lateral displacement of materials in said second cushion;
  the vertical thicknesses of said first and second cushions being substantially greater than the vertical thickness of said relatively rigid member;
  said relatively rigid member having transverse dimensions including length and width dimensions, said first and second cushions having substantially identical transverse dimensions, said relatively rigid member having at least one transverse dimension generally less than the corresponding transverse dimensions of said first and second cushions, said relatively rigid member having a first outer edge, said first and second cushions having at least one common second outer edge and at least one indentation between said one common second outer edge of said first and second cushions and the corresponding first outer edge of said relatively rigid member;
  said corresponding first outer edge of said relatively rigid member being indented relative to said common second outer edge;
  said first cushion having a plurality of horizontal layers, the uppermost of said horizontal layers having a lower internal lateral displacement than a lower one of said horizontal layers.

4. A multi-layer seat according to claim 3 in which said second cushion has a plurality of second horizontal layers, the uppermost of said second horizontal layers having a higher internal lateral displacement than a lower one of said second horizontal layers.

5. A multi-layer seat which protects a person sitting on the seat in a moving device from impacts associated with vertical movements of the seat in the device, the seat comprising:
  a seat base coupled to said moving device;
  a first cushion;
  a second cushion which is located vertically below said first cushion and which is positioned on top of said seat base; and
  a relatively rigid member having substantially uniform rigidity which (A) substantially separates said first and second cushions, (B) transmits vertical thrust to said cushions, and (C) moves vertically as a whole as said second cushion compresses;
  said first cushion being formed of a foam rubber material which partially absorbs a first downward vertical force applied to said first cushion from above by internal lateral displacement and partially transmits downward a second vertical downward force to said relatively rigid member,
  said relatively rigid member transmitting a third vertically downward force from said first cushion to said second cushion,
  said second cushion being formed of a foam rubber material of substantially unitary density having an internal lateral displacement of between 30 and 36 characterized by the fact that said third vertically downward force applied to said second cushion by said relatively rigid member is absorbed by internal lateral displacement of said foam rubber material in said second cushion;
  the vertical thicknesses of said first and second cushions being substantially greater than the vertical thickness of said relatively rigid member;
  said relatively rigid member having transverse dimensions including length and width dimensions, said first and second cushions having substantially identical transverse dimensions, said relatively rigid member having at least one transverse dimension generally less than the corresponding transverse dimensions of said first and second cushions, said relatively rigid member having a first outer edge, said first and second cushions having at least one common second outer edge and at least one indentation between said one common second outer edge of said first and second cushions and the corresponding first outer edge of said relatively rigid member; said corresponding first outer edge of said relatively rigid member being indented relative to said common second outer edge.

6. A multi-layer seat according to claim 1 in which all transverse dimensions of said relatively rigid member are substantially less than the corresponding transverse dimensions of said first and second cushions and there is an indentation between all the outer edges of said relatively rigid member and all the common outer edges of said first and second cushions around the perimeter of said seat.

7. A multi-layer seat according to claim 1 in which said first cushion comprises a plurality of layers including an upper layer with an internal lateral displacement in the range of 18 to 24 and a lower layer with an internal lateral displacement in the range of 30 to 36 and spreads said first downward vertically force laterally and vertically to said relatively rigid member.

8. A multi-layer seat according to claim 1 in which the thickness of said first and second cushions are substantially equal.

* * * * *